(12) United States Patent
Kim et al.

(10) Patent No.: US 9,051,189 B2
(45) Date of Patent: Jun. 9, 2015

(54) SYSTEM AND METHOD FOR CARBON DIOXIDE SOLIDIFICATION

(75) Inventors: Tae Young Kim, Gyeonggi-do (KR); Sung Yeup Chung, Seoul (KR); Ki Chun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 481 days.

(21) Appl. No.: 13/302,197

(22) Filed: Nov. 22, 2011

(65) Prior Publication Data

US 2013/0078168 A1    Mar. 28, 2013

(30) Foreign Application Priority Data

Sep. 28, 2011    (KR) .................. 10-2011-0098545

(51) Int. Cl.
| | |
|---|---|
| *C01F 11/18* | (2006.01) |
| *C01D 7/00* | (2006.01) |
| *C01F 5/24* | (2006.01) |
| *C01D 7/16* | (2006.01) |
| *C01D 7/07* | (2006.01) |
| *C01B 31/24* | (2006.01) |

(52) U.S. Cl.
CPC . *C01F 11/18* (2013.01); *C01D 7/00* (2013.01); *C01F 5/24* (2013.01); *C01F 11/181* (2013.01); *C01D 7/16* (2013.01); *C01D 7/07* (2013.01); *C01B 31/24* (2013.01)

(58) Field of Classification Search
CPC .............. C01D 7/00; C01D 7/07; C01D 7/16; C01F 5/24; C01F 11/18; C01F 11/181
USPC ................................. 423/430, 432
See application file for complete search history.

(56) References Cited

U.S. PATENT DOCUMENTS 6,193,945 B1 *   2/2001   Blomquist et al. ............ 423/430
2011/0139628 A1   6/2011   Teir et al.

FOREIGN PATENT DOCUMENTS

| CN | 1305956 A | 8/2001 |
|---|---|---|
| CN | 1854069 A | 11/2006 |
| CN | 101134155 A | 3/2008 |
| CN | 101920983 A | 12/2010 |
| JP | 2005097072 A | 4/2005 |
| KR | 10-0283527 | 12/2000 |
| KR | 10-2001-0083819 | 9/2001 |
| KR | 10-2006-0070017 | 6/2006 |
| KR | 10-0891551 | 3/2009 |
| KR | 10-0958593 | 5/2010 |
| KR | 10-0998916 | 12/2010 |
| KR | 10-2011-0018911 | 2/2011 |
| KR | 10-2011-0061546 | 6/2011 |

* cited by examiner

*Primary Examiner* — Stuart Hendrickson

(57) ABSTRACT

Disclosed is a method for solidifying carbon dioxide into carbonate, in which carbon dioxide is stably converted into and solidified into carbonate (mineral facies) by using steel slag or natural mineral by extracting an alkali component by supplying an ammonium salt solvent as an extraction solvent to raw slag and injecting carbon dioxide into an extract solution supplied to a carbonation reactor to produce carbonate precipitate from the extract solution through the induction of a conversion reaction of the carbon dioxide into the carbonate precipitate. Then after the above two step are performed at least one an acetic acid solvent is supplied as an extraction solvent to the raw slag so as to finally extract an alkali component; and carbon dioxide is injected into an extract solution to produce carbonate precipitate from the extract solution through the induction of a conversion reaction of the carbon dioxide into the carbonate precipitate.

5 Claims, 2 Drawing Sheets

SYSTEM AND METHOD FOR CARBON DIOXIDE SOLIDIFICATION

CROSS-REFERENCE TO RELATED APPLICATION

This application claims under 35 U.S.C. §119(a) the benefit of Korean Patent Application No. 10-2011-0098545 filed on Sep. 28, 2011, the entire contents of which are incorporated herein by reference.

BACKGROUND (a) Technical Field

The present invention relates to a system and method for solidifying carbon dioxide into carbonate. More particularly, the present invention relates to a system and method for solidifying carbon dioxide into carbonate in which carbon dioxide is stably converted into and solidified into carbonate (mineral facies) by using steel slag or natural mineral.

(b) Background Art

A solidification technology of carbon dioxide into carbonate is a system and method for disposing of separated/collected carbon dioxide, which has been raised as an alternative technology for geological/deep zone storage. The ultimate object of the technology is to produce a carbon component through conversion of carbon dioxide, and convert the produced carbon component into fuel or a basic compound required for industrial processes.

In other words, the conversion of carbon dioxide into another material such as carbonate provides an environmentally friendly advantage because it removes carbon dioxide from the air which causes global warming. Furthermore, the conversion allows carbon dioxide to be applied as a raw material for industrial basic materials.

As shown in FIG. 1, in conventional solidification of carbon dioxide into carbonate by using steel slag or natural mineral, in order to extract an alkali metal component such as calcium, acetic acid has been used as an extraction solvent. Beneficially, it is possible to maximize the total amount of solidified carbon dioxide since the calcium extraction ratio of acetic acid is much higher than those of other solvents.

However, in solidification of carbon dioxide into carbonate, when a large amount of acetic acid is used as an extraction solvent for extracting an alkali metal component, it is difficult to handle the acetic acid due to strong olfactory acridity. Also, in this case, other components of slag besides calcium may be eluted, and thus many other impurities may be precipitated together with a conversion reaction of carbon dioxide into carbonate. Further, since it is required to add a large amount of sodium hydroxide (NaOH) as a pH adjuster for a carbonate conversion reaction, an additional cost is required. The use of sodium hydroxide excessively produces calcium hydroxide ($Ca(OH)_2$), and thus produces suspended solids, which interferes with the conversion of calcium into calcium carbonate ($CaCO_3$). Thus, the purity of the converted calcium carbonate is low thereby requiring a lot of additional purifying steps. This lowers economical efficiency.

In order to improve the above described problems, in the solidification of carbon dioxide into carbonate, acetic acid has been conventionally substituted by ammonium salt, etc. Then, the use condition of ammonium salt has been optimized so that carbon dioxide can be stably solidified into carbonate.

Ammonium salt is not acrid, unlike acetic acid, and is easy to handle. Especially, in this case, the calcium extraction selectivity is high, and thus during the extraction of calcium from slag, other components except for calcium are hardly eluted. Also, there is an advantage in that since a pH of a solution is increased after the extraction, a carbonate conversion reaction can be efficiently carried out without the addition of sodium hydroxide during the carbonate conversion reaction. Furthermore, there is an advantage in that since there are no other impurity components, it is possible to collect high purity $CaCO_3$. Thus, it is expected to improve the economical efficiency according to a reduction of the consumption amount of sodium hydroxide, and the collection of high purity calcium carbonate.

However, the above described ammonium salt has a low calcium extraction ratio, thereby reducing the ratio of solidification of carbon dioxide. Also, the conventional method for solidifying carbon dioxide into carbonate, as shown in FIG. 2, induces a reaction for extracting an alkali component by using ammonium salt at a very low concentration. Thus, the extraction ratio of calcium from slag is very low.

Also, in the conventional method for solidifying carbon dioxide into carbonate, as shown in FIG. 2, carbon dioxide is injected immediately after calcium extraction without a pH adjusting step, thereby inducing the carbonate conversion reaction. Thus, the final amount of converted carbonate is also not large enough.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art. The present invention provides a system and method for solidifying of carbon dioxide into carbonate. In the system and method, the use of high concentration ammonium salt increases the calcium extraction selectivity, and increases a pH of an extract solution. This minimizes the amount of sodium hydroxide, and induces an efficient carbonate conversion reaction. Also, in the system and method, the use of acetic acid for final extraction of an alkali component increases the amount of solidified carbon dioxide. This not only induces an efficient carbonate conversion reaction but also maximizes the amount of solidified carbon dioxide.

In one aspect, the present invention provides a system and method for solidifying carbon dioxide into carbonate, the method including the steps of: (a) extracting an alkali component by supplying an ammonium salt solvent as an extraction solvent to raw slag; (b) injecting carbon dioxide into an extract solution supplied to a carbonation reactor to produce carbonate precipitate from the extract solution through induction of a conversion reaction of the carbon dioxide into the carbonate precipitate, the extract solution containing the alkali component; (c) supplying an acetic acid solvent as an extraction solvent to the raw slag so as to finally extract an alkali component; and (d) injecting carbon dioxide into an extract solution supplied to the carbonation reactor to produce carbonate precipitate from the extract solution through induction of a conversion reaction of the carbon dioxide into the carbonate precipitate, the extract solution containing the alkali component extracted in step (c).

Preferably, the steps (a) and (b) are carried out once or are repeated several times or more, and then the steps (c) and (d) are carried out by supplying the acetic acid solvent to the raw slag collected after completion of the steps (a) and (b). Also, preferably, between the steps (a) and (b), a pH adjuster may be selectively added in order to increase the pH of the extract solution containing the alkali component from 8-9 to 12.

Also, the ammonium salt may be any one selected from the group including ammonium chloride, ammonium nitrate, and ammonium acetate, and the raw slag may be separately discharged from the extract solution containing the alkali component is collected and recycled.

Other aspects and exemplary embodiments of the invention are discussed infra.

In the inventive method for solidifying of carbon dioxide into carbonate, only an alkali component such as calcium from raw slag is selectively extracted in a solution phase, and is solidified into carbonate precipitation through a reaction with carbon dioxide in a gas phase. Thus, it is possible to reduce carbon dioxide and also effectively produce and collect calcium carbonate as precipitation.

Also, in the present invention, it is possible to collect high purity carbonate by using ammonium salt as an extraction solvent. Thus, it is possible to reduce a process time and a cost for purifying, compared to conventional low purity carbonate obtained by physical pulverization. Furthermore, it is possible to make at least several times higher profit than that of the low purity carbonate. Finally, in the present invention, it is possible to reduce the cost for disposal of slag by collecting low-basicity slag and recycling it as aggregate.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
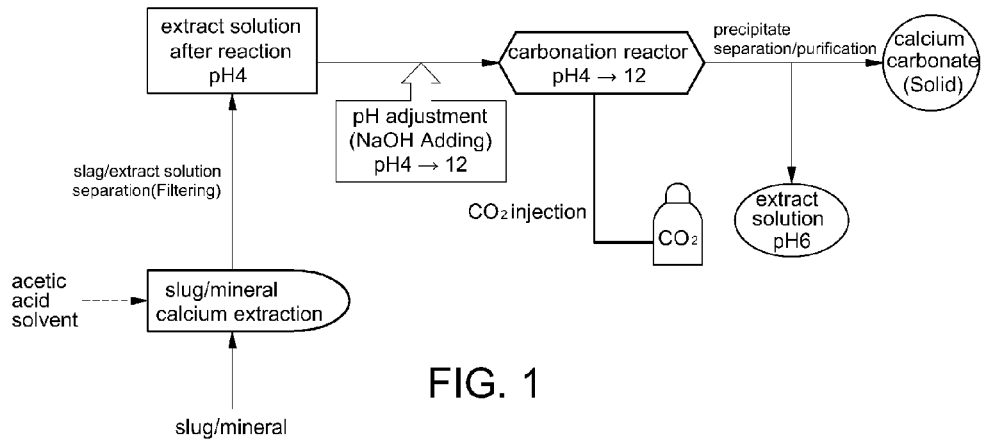
FIG. 1 is a flow chart schematically showing a solidification method of carbon dioxide into carbonate, according to a conventional method.
Figure 2:
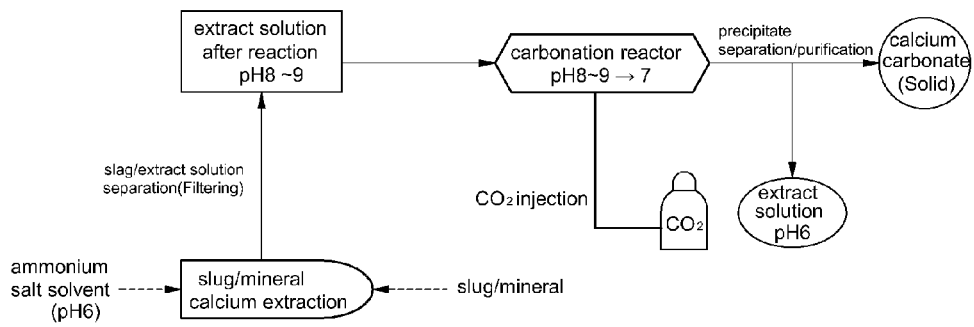
FIG. 2 is a flow chart schematically showing a solidification method of carbon dioxide into carbonate, according to another conventional method.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an optimum solidification method, in which high concentration ammonium salt is used so as to increase the selective extraction ratio of calcium, and to increase the pH of an extract solution. This minimizes the amount of sodium hydroxide to be used, thereby inducing an efficient carbonate conversion reaction. Meanwhile, ammonium salt is effective in the collection of high purity carbonate, but shows a lower calcium extraction ratio than acetic acid. Thus, the total amount of solidified carbon dioxide is small. In order to complement this disadvantage, in the final extraction of an alkali component from raw slag, acetic acid is used instead, thereby increasing the amount of solidified carbon dioxide. This not only induces an efficient carbonate conversion reaction but also increases the total amount of solidified carbon dioxide.

Accordingly, in the present invention, two kinds of solvents including ammonium salt and acetic acid are sequentially used so that calcium carbonate of good quality can be collected from a limited amount of slag (steel by-product) or natural minerals, and the total amount of solidified carbon dioxide can be maximized.

For this, in the present invention, when natural minerals, steel slag, and electric arc furnace slag, which contain alkali components such as calcium, magnesium, are used to solidify carbon dioxide, high concentration ammonium salt is used to extract calcium ions and to obtain an extract solution of pH 8 or more during extraction and carbonation reaction processes at room temperature and atmospheric pressure. Then, a small amount of a pH adjuster is added to adjust the pH of the extract solution supplied to a carbonation reactor, and carbon dioxide is injected into the extract solution, thereby inducing an effective carbonate conversion reaction.

In the present invention, since a slag used for solidifying carbon dioxide through carbonation includes electric arc furnace slag as well as steel slag, it is possible to recycle the electric arc furnace slag which typically is wasted. Also, in the use of ammonium salt during the process at room temperature and atmospheric pressure, high concentration ammonium salt of 80 g/L is used as an extraction solvent. This increases the extraction ratio of calcium, compared to a conventional technology. Furthermore, the pH is increased up to 12 by the addition of a small amount of the pH adjuster, and then a carbonation reaction of carbon dioxide is induced. Accordingly, it is possible to collect a large amount of calcium carbonate of good quality, compared to a conventional technology.

Also, in the final step of the present invention, acetic acid is used as an extraction solvent so as to increase the extraction ratio of calcium. This allows the total amount of solidified carbon dioxide to be maximized In other words, since the calcium extraction selectivity of ammonium salt is high, it is possible to obtain high purity calcium carbonate. Also, due to the use of high concentration ammonium salt, the pH of the extraction solution is increased, which allows a carbonate conversion reaction to be effectively carried out. Subsequently, acetic acid is used as an extraction solvent, thereby increasing the extraction ratio of an alkali component. This increases the total amount of solidified carbon dioxide.

Figure 3:
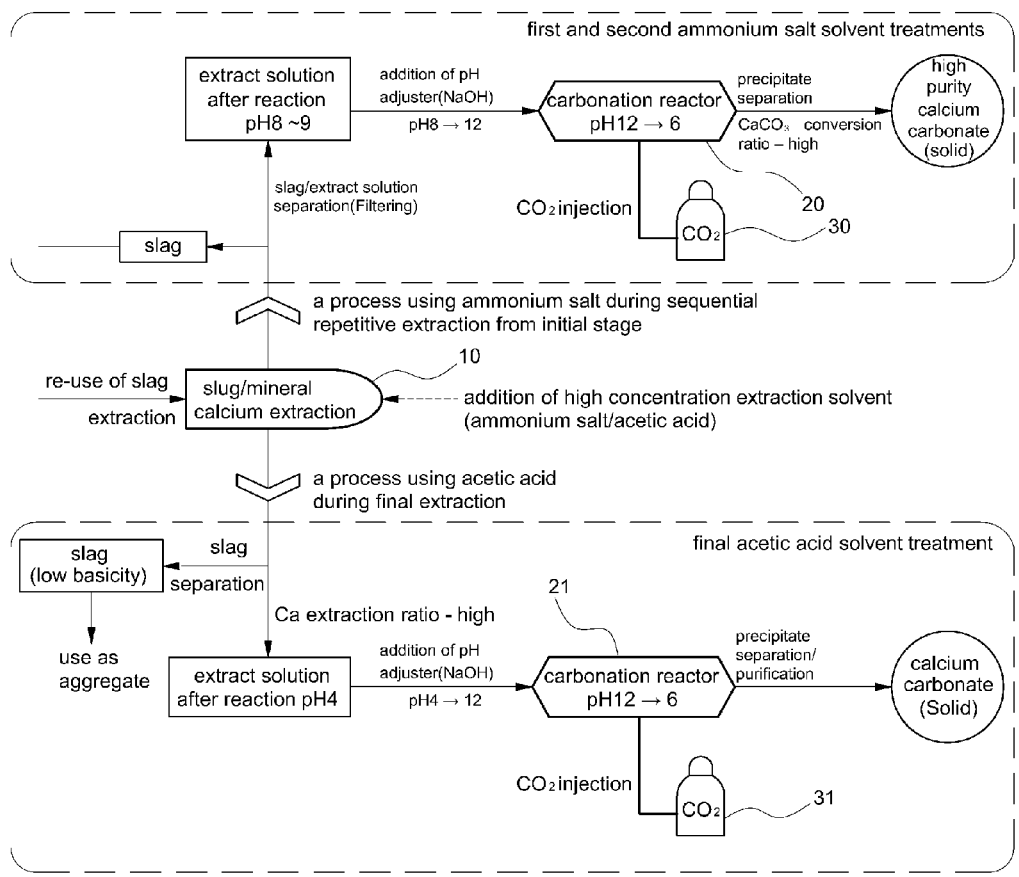
FIG. 3 is a flow chart schematically showing a solidification method of carbon dioxide into carbonate, according to the exemplary embodiment of the present invention.

Hereinafter, the present invention will be described in detail with reference to FIG. 3.

First, in an alkali component extraction reactor 10, a process for extracting an alkali component is carried out. For example, a raw mineral or slag (e.g., all slags produced by an iron manufacturing process, and an electric arc furnace steelmaking process) are supplied to the alkali component extraction reactor 10 while a high concentration extraction solvent is supplied. Then, stirring is carried out for a predetermined time.

In the alkali component extraction reactor 10, in order to extract an alkali component such as calcium from the slag (a by-product of an iron manufacturing process), various kinds of slags and extraction solvents may be used. As the extraction solvents, high concentration ammonium salt (ammonium chloride, ammonium nitrate, and ammonium acetate) and acetic acid may be sequentially used.

Herein, first, in order to produce and collect high purity carbonate from a mineral and slag, high concentration ammonium salt is used as an extraction solvent, thereby efficiently inducing a carbonation reaction. Then, subsequently while extracting an alkali metal component, acetic acid is used as an extraction solvent, thereby increasing the amount of solidified carbon dioxide. Thus, the slag (with reduced basicity) from which the alkali metal component has been extracted and separated can be recycled as aggregate.

Ammonium salt has a pH of 6. When raw slag together with high concentration ammonium salt is added to the alkali component extraction reactor 10 and stirred, a solution including an extract of an alkali component such as calcium (Ca), that is, an alkali component-containing extract solution extracted from the slag by the ammonium salt as an extract solvent, has a pH of 8-9. In other words, the slag introduced into the alkali component extraction reactor 10 is stirred until an extract solution of pH 8-9 is obtained.

In order to adjust the pH of the extract solution from 8-9 to 12, before the extract solution is supplied to the carbonation reactor 20, sodium hydroxide (NaOH) as a pH adjuster is added to the extract solution.

Meanwhile, since the extract solution has a relatively high pH of 8-9, in some cases, it may be directly used for the carbonation reaction without a pH adjusting step. In other words, without a step for adjusting the pH of the extract solution from 8-9 to 12, the extract solution may be directly supplied to the carbonation reactor 20.

Then, the solution containing an extracted alkali component, with a pH of 12, that is, the extract solution, is supplied to the carbonation reactor 20 while carbon dioxide is supplied from a carbon dioxide supplying means 30 to the carbonation reactor 20. Accordingly, the extract solution (containing an alkali metal component) of pH 12 flows into the carbonation reactor 20 while carbon dioxide is injected and converted into carbonate precipitate through reaction with the extract solution. In this manner, the carbonate reaction is induced within the carbonation reactor 20 while the carbonate precipitate is produced from the extract solution. In other words, carbon dioxide in gas phase is directly injected into the carbonation reactor 20, is reacted with alkali ions at pH 12, and becomes dissolved carbonate. Then, through separation of precipitate/solution, precipitated high purity carbonate is obtained. Herein, the extract solution from which carbonate has been separated has a pH of 6-7.

As described above, the extract solution containing an alkali metal component extracted from slag is subjected to a carbonation reaction at room temperature and atmospheric pressure, and thereby carbon dioxide can become carbonate with a high conversion ratio and can be fixed. Then, the raw slag, which is separated from the extract solution and discharged from the alkali component extraction reactor 10, is collected again into the alkali component extraction reactor 10 for recycling.

The above described process for producing and obtaining high purity carbonate by using ammonium salt as an extract solution may be carried out once or may be repeated several times or more. Then, after the process for producing high purity carbonate by the ammonium salt is completed, acetic acid is finally used as an extract solvent so as to produce an extract solution (pH 4) containing an alkali metal component extracted from the slag at a high extraction ratio.

In the treatment of carbon dioxide with acetic acid as an extraction solvent, first, the raw slag recycled into the alkali component extraction reactor 10 is added with acetic acid, and stirred. Then, a solution including an extract of an alkali component such as calcium (Ca), that is, an alkali component-containing extract solution extracted from the slag by the acetic acid as an extract solvent, is produced. The slag collected into the alkali component extraction reactor 10 is stirred until an extract solution of pH 4 is obtained.

In order to adjust the pH of the extract solution from 4 to 12, before the extract solution with pH 4 is supplied to a carbonation reactor 21, sodium hydroxide (NaOH) as a pH adjuster is added to the extract solution. Then, the extract solution with an adjusted pH of 12 is supplied to the carbonation reactor 21 while carbon dioxide is supplied from a carbon dioxide supplying means 31 to the carbonation reactor 21.

Accordingly, the extract solution (containing an alkali metal component) of pH 12 flows into the carbonation reactor 21 while carbon dioxide is injected and converted into carbonate precipitate through reaction with the extract solution. In this manner, the carbonate reaction is induced within the carbonation reactor 21 while the carbonate precipitate is produced from the extract solution. In other words, carbon dioxide in gas phase is directly injected into the carbonation reactor 21, is reacted with alkali ions at pH 12, and becomes dissolved carbonate. Then, through separation of precipitate/solution, precipitated carbonate is obtained. Herein, the extract solution from which carbonate has been separated has a pH of 6-7.

As described above, the extraction reaction is carried out with high efficiency by using acetic acid as a solvent so as to greatly reduce the alkali component within raw slag. Then, through the carbonation reaction induced by injection of carbon dioxide into the extract solution, it is possible to maximize the total amount of solidified carbon dioxide. Also, the finally collected slag can have an appropriate low basicity and can be recycled as aggregate.

EXAMPLES

The following examples illustrate the invention and are not intended to limit the same.

Hereinafter, the present invention will be described in detail with reference to Examples, but the Examples do not limit the scope of the present invention. For example, the slag used in Examples below is only intended to explain a specific embodiment, and in actuality, various kinds of slags can be used.

Example

A carbonation reaction for converting carbon dioxide into carbonate was carried out by using steel slag as a raw material and using ammonium chloride as a solvent. First, 100 g of steel slag was introduced into an alkali component extraction reactor, and 1L of an ammonium chloride solution including ammonium chloride dissolved in water was introduced as an extract solvent in the extraction reactor. Herein, ammonium chloride was used in an amount of 93.5g/1.74 mol % with respect to 100 g of steel slag, and the pH of the solution was about 6.

Then, in the alkali component extraction reactor, the slag and the solution were stirred by using an impeller at 150 rpm for about 30 minutes, and then, an extract solution containing a calcium component eluted from the slag, and the slag were separately discharged by using a filter. Herein, the pH of the extract solution ranged from 8 to 9, and sodium hydroxide as a pH adjuster was added so as to adjust the pH to 12.

Next, in a carbonation reactor, carbon dioxide in a gas phase was directly injected at a flow rate of 2 L/min into the extract solution containing the calcium component, and thereby a reaction producing calcium carbonate was induced through a reaction of carbon dioxide with calcium ions. While carbon dioxide was injected to the extract solution, precipitate of calcium carbonate was produced within the carbonation reactor. The reaction was carried out until the pH of the extract solution became 7 to 6. Then, the injection of carbon dioxide was finished, and the precipitate was separated from the solution so as to provide high purity calcium carbonate.

After the first extraction reaction as described above, the amount of extracted calcium was only 15-20% of calcium oxide (CaO) of the initial steel slag. Thus, the basicity of the slag was not sufficiently lowered. In order to complement the lower calcium extraction ratio with respect to acetic acid, the slag which has been already used was collected and used for a re-extraction reaction. In other words, the first calcium extraction reaction using ammonium chloride was repeatedly carried out once more so as to carry out the carbonation reaction of carbon dioxide.

The amount of calcium extracted by repeating the calcium extraction reaction using ammonium chloride as an extraction solvent several times was not large. However, after the extraction, the calcium extraction selectivity was high during the conversion reaction of carbon dioxide into carbonate. Thus, it was possible to obtain calcium carbonate of good quality through a direct reaction of calcium ions and carbon dioxide. In this manner, by repeating the alkali metal component extraction reaction using ammonium salt as an extraction solvent several times, it is possible to produce and collect high purity calcium carbonate.

Next, in order to improve the amount of solidified carbon dioxide by finally increasing the extraction ratio of calcium from slag, in a last calcium extraction process, acetic acid with a calcium extraction ratio of 90% or more was used as a solvent while the component of calcium oxide of slag was greatly reduced by an extraction reaction in an alkali component extraction reactor. Then, the extract solution with an adjusted pH of 12 was introduced into a carbonation reactor, and carbon dioxide was injected thereto. Through a carbonation reaction, carbon dioxide was solidified. In other words, by the extract solution containing the extracted calcium content at a high concentration, carbon dioxide was carbonated, so that the total amount of solidified carbon dioxide was maximized.

The slag separately discharged during calcium extraction using acetic acid had a low basicity appropriate for recycling as an aggregate due to the great reduction of calcium oxide because calcium was extracted with a high extraction ratio.

In the Example above, the alkali component extraction reaction using ammonium salt as an extraction solvent was repeated twice, and finally, acetic acid was used as an extraction solvent so as to increase the amount of solidified carbon dioxide. Thus, it was possible to produce and collect calcium carbonate with a high purity, and maximize the total amount of solidified carbon dioxide.

According to the kinds of extraction solvent (such as ammonium salt and acetic acid) for extraction of an alkali metal component, a calcium extraction ratio and a calcium carbonate conversion ratio were noted in Table 1 below.

TABLE 1

| kind of solvent | Ca extraction ratio | $CaCO_3$ conversion ratio |
| --- | --- | --- |
| ammonium chloride (ammonium salt) | 15~20% | 93% |
| acetic acid | 90% or more | 25% |

As noted above, in the present invention, for the initial extraction of an alkali component, ammonium salt having a high extraction selectivity of the alkali component is used as a solvent, and thus, other components are hardly eluted from the slag. Furthermore, the pH of the extract solution becomes 8 or more during the process, thereby reducing the amount of a pH adjuster by up to 50% or more. Accordingly, the amount of operating time and cost is reduced. Also, the suspended solids caused by the production of calcium hydroxide (Ca(OH)$_2$) (a residual product of sodium hydroxide (NaOH)) are eliminated. Thus, high-purity and high-quality calcium carbonate precipitate without an additional post-treatment and an additional purifying step are obtained. This makes it easy to produce calcium carbonate henceforth.

As described above, the subsidence high-purity calcium carbonate obtained by chemical precipitation achieves economical efficiency at least several times higher than conventional calcium carbonate obtained by physical pulverizing. However, in the case where only the conventional ammonium salt is used as a solvent, the extraction selectivity of an alkali component is high while the extraction ratio of the alkali component is very low with respect to acetic acid. Furthermore, the amount of solidified carbon dioxide is small, and the reduction extent of basicity of slag is low. Thus, it is difficult to recycle the slag as an aggregate.

Accordingly, in the present invention, in order to increase the amount of solidified carbon dioxide, first, the step of collecting high purity carbonate from slag by using ammonium salt is carried out at least once, and then, in the final step, acetic acid is used to increase the usability of slag as an aggregate and the amount of solidified carbon dioxide.

As described above, in the present invention, in solidifying carbon dioxide through carbonation, ammonium salt and acetic acid are sequentially used. Thus, the effect of a conventional acetic acid solvent is maintained while the disadvantage of an ammonium salt solvent is complemented. This causes additional effects such as the collection of high purity carbonate, and the reduction of an amount of a pH adjuster. Then, finally, economical efficiency is also improved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:
1. A method for solidifying carbon dioxide into carbonate, the method comprising steps of:
(a) extracting calcium component by supplying an ammonium salt solution as an extraction solvent to raw slag;
(b) injecting carbon dioxide into an extract solution from the step (a) which is supplied to a carbonation reactor to produce carbonate precipitate from the extract solution through induction of a conversion reaction of the carbon dioxide into the carbonate precipitate, the extract solution containing the calcium component,

(c) supplying an acetic acid solvent as an extraction solvent to the raw slag collected after completion of the steps (a) and (b) so as to additionally extract calcium component; and (d) injecting carbon dioxide into an extract solution from the step (c) which is supplied to a carbonation reactor to produce carbonate precipitate from the extract solution through induction of a conversion reaction of the carbon dioxide into the carbonate precipitate, the extract solution containing the calcium component extracted in the step (c), wherein, between the steps (a) and (b), a step of adding a pH adjuster to the extract solution from the step (a) is selectively carried out to increase a pH of the extract solution containing the calcium component to pH 12.

2. The method of claim 1, wherein the steps (a) and (b) are carried out once or are repeated several times or more, and then the steps (c) and (d) are carried out by supplying the acetic acid solvent to the raw slag collected after completion of the steps (a) and (b).

3. The method of claim 1, wherein between the steps (c) and (d), a step of adding a pH adjuster is carried out in order to increase a pH of the extract solution from the step (c) containing the calcium component from pH 4 to pH 12.

4. The method of claim 1, wherein the ammonium salt is any one selected from the group consisting of ammonium chloride, ammonium nitrate, and ammonium acetate.

5. The method of claim 1, wherein the raw slag separately discharged from the extract solution containing the calcium component is collected and recycled.

\* \* \* \* \*